US012095855B2

(12) United States Patent
Desmouceaux et al.

(10) Patent No.: US 12,095,855 B2
(45) Date of Patent: *Sep. 17, 2024

(54) DISTRIBUTED RESILIENT LOAD-BALANCING FOR MULTIPATH TRANSPORT PROTOCOLS

(71) Applicant: Cisco Technology, Inc., San Jose, CA (US)

(72) Inventors: Yoann Desmouceaux, Paris (FR); Pierre Pfister, Chalons-en-Champagne (FR); Aloys Augustin, Paris (FR); Mohammed Hawari, Ile de France (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,845

(22) Filed: Jan. 26, 2023

(65) Prior Publication Data

US 2023/0179652 A1 Jun. 8, 2023

Related U.S. Application Data

(63) Continuation of application No. 16/853,048, filed on Apr. 20, 2020, now Pat. No. 11,570,239.

(51) Int. Cl.
*H04L 67/1023* (2022.01)
*H04L 45/24* (2022.01)
(Continued)

(52) U.S. Cl.
CPC .......... *H04L 67/1023* (2013.01); *H04L 45/24* (2013.01); *H04L 67/146* (2013.01);
(Continued)

(58) Field of Classification Search
CPC . H04L 45/24; H04L 45/7453; H04L 67/1023; H04L 69/164; H04L 47/125
See application file for complete search history.

(56) References Cited

U.S. PATENT DOCUMENTS 9,432,245 B1 8/2016 Sorenson, III et al.
9,509,616 B1 11/2016 Judge et al.
(Continued)

FOREIGN PATENT DOCUMENTS

CN 106453088 2/2017
WO WO2013072989 5/2013

OTHER PUBLICATIONS

M. Coudron, S. Secci, G. Pujolle, P. Raad and P. Gallard, "Cross-layer cooperation to boost multipath TCP performance in cloud networks," 2013 IEEE 2nd International Conference on Cloud Networking (Cloud Net), 2013, pp. 58-66, doi: 10.1109/CloudNet .2013.6710558. (Year: 2013), 9 pages.
(Continued)

*Primary Examiner* — Hitesh Patel
*Assistant Examiner* — Alex H. Tran
(74) *Attorney, Agent, or Firm* — Lee & Hayes, P.C.

(57) ABSTRACT

Techniques are described for providing a distributed application load-balancing architecture that supports multipath transport protocol for client devices connecting to an application service. Rather than having client devices generate new network five-tuples for new subflows to the application servers, the techniques described herein include shifting the burden to the application servers to ensure that the new network five-tuples land in the same bucket in the consistent hashing table. The application servers may receive a hashing function utilized by the load balancers to generate the hash of the network five-tuple. By having the application servers generate the hashes, the load balancers are able to continue stateless, low-level processing of the packets to route them
(Continued)

to the correct application servers. In this way, additional subflows can be opened for client devices according to a multipath transport protocol while ensuring that the subflows are routed to the correct application server.

20 Claims, 10 Drawing Sheets

(51) Int. Cl.
*H04L 67/01* (2022.01)
*H04L 67/146* (2022.01)
*H04L 69/163* (2022.01)
*H04L 69/164* (2022.01)
*H04L 69/165* (2022.01)

(52) U.S. Cl.
CPC .......... *H04L 69/163* (2013.01); *H04L 69/164* (2013.01); *H04L 69/165* (2013.01); *H04L 67/01* (2022.05)

(56) References Cited

U.S. PATENT DOCUMENTS

| | | | |
|---|---|---|---|
| 9,843,520 | B1 | 12/2017 | Haltore et al. |
| 10,659,569 | B1* | 5/2020 | Tourrilhes ............ H04L 61/2514 |
| 10,951,515 | B2* | 3/2021 | Shelar ...................... H04L 45/24 |
| 11,088,942 | B2* | 8/2021 | Boucadair ............... H04L 69/18 |
| 11,223,565 | B2* | 1/2022 | Buddhikot ............ H04L 47/125 |
| 11,258,823 | B2* | 2/2022 | Dutta .................. H04L 63/0428 |
| 11,522,790 | B2* | 12/2022 | Wei ........................ H04L 67/141 |
| 2006/0126625 | A1 | 6/2006 | Schollmeier et al. |
| 2013/0332602 | A1 | 12/2013 | Nakil et al. |
| 2014/0351447 | A1* | 11/2014 | Annamalaisami ............................ H04L 65/1069 709/227 |
| 2015/0124828 | A1 | 5/2015 | Cj et al. |
| 2015/0281367 | A1 | 10/2015 | Nygren et al. |
| 2016/0112239 | A1 | 4/2016 | Kanugovi et al. |
| 2016/0142287 | A1 | 5/2016 | Yang et al. |
| 2016/0142295 | A1* | 5/2016 | Parsa .................. H04L 45/7453 370/392 |
| 2016/0218960 | A1 | 7/2016 | Sundarababu et al. |
| 2016/0261722 | A1 | 9/2016 | Paasch et al. |
| 2017/0063699 | A1 | 3/2017 | Kim |
| 2017/0163522 | A1 | 6/2017 | Sreeramoju et al. |
| 2018/0062979 | A1 | 3/2018 | Zee et al. |
| 2018/0367364 | A1 | 12/2018 | Johansson |
| 2018/0375967 | A1 | 12/2018 | Pithawala et al. |
| 2019/0245915 | A1 | 8/2019 | Kommula et al. |
| 2019/0334863 | A1* | 10/2019 | Medvedkin ......... H04L 61/2514 |
| 2020/0028899 | A1 | 1/2020 | Zhou et al. |
| 2020/0099620 | A1 | 3/2020 | Shen et al. |
| 2020/0274819 | A1 | 8/2020 | Nahum et al. |
| 2020/0287996 | A1 | 9/2020 | Vann et al. |
| 2020/0389403 | A1 | 12/2020 | Buddhikot et al. |
| 2021/0099386 | A1 | 4/2021 | Goel et al. |
| 2021/0119904 | A1 | 4/2021 | Yu et al. |
| 2021/0306254 | A1 | 9/2021 | Marrotte |
| 2021/0329069 | A1 | 10/2021 | Desmouceaux et al. |
| 2022/0091892 | A1* | 3/2022 | Wang ...................... H04L 69/16 |

OTHER PUBLICATIONS

Duchene et al, "Making Multipath TCP friendlier to load balancers and anycast", 2017 IEEE 25th International Conference on Network Protocols (ICNP), 2017, pp. 1-10, doi:10.1109/ICNP.2017.8117545(Year 2017), 10 pages.

Ford et al.," TCP Extensions for Multipath Operation with Mulltple Addresses (RFC8684)", 2020, An IP.com Prior Art Database Technical Disclosure, 2020 (Year 202), 69 pages.

P. Manzanares-Lopez, J.P. Mufioz-Gea and J. Malgosa-Sanahuja, "An MPTCP-Compatible Load Balancing Solution for Pools ofServers in OpenFlow SON Networks," 2019 Sixth International Conference on Software Defined Systems (SOS), 2019, pp. 39-46, doi: 10.1109/SDS.2019.8768495. (Year: 2019), 8 p.

Office Action for U.S. Appl. No. 16/853,048, mailed Nov. 10, 2021, Desmouceaux, "Distributed Resilient Load-Balancing for Multipath Transport Protocols", 16 pages.

Office Action for U.S. Appl. No. 16/853,048, mailed Dec. 27, 2021, Desmouceaux, "Distributed Resilient Load-Balancing for Multipath Transport Protocols", 19 pages.

Office Action for U.S. Appl. No. 16/853,048, malled Feb. 25, 22, Desmouceaux, "Distributed Resilient Load-Balancing for Multipath Transport Protocols", 18 pages.

Office Action for U.S. Appl. No. 16/853,048, mailed on Aug. 25, 2022, Desmouceaux, "Distributed Resilient 8 Load-Balancing for Multipath Transport Protocols ", 18 pages.

* cited by examiner

600 ⤴

(6A)

↓

IDENTIFY, AT THE SECOND SERVER, THE CONNECTION ID ASSOCIATED WITH THE MULTIPATH CONNECTION AT THE FIRST SERVER
610

↓

BASED AT LEAST IN PART ON IDENTIFYING THE CONNECTION ID, FORWARD THE FIRST PACKET TO THE FIRST SERVER
612

↓

AT LEAST PARTLY RESPONSIVE TO RECEIVING THE FIRST PACKET AT THE FIRST SERVER, COMPUTE A SECOND DESTINATION PORT OF THE SERVER TO BE INCLUDED IN A SECOND FIVE-TUPLE SUCH THAT A FIRST HASH OF A FIRST FIVE-TUPLE CORRESPONDS TO A SECOND HASH OF THE SECOND FIVE-TUPLE
614

↓

SEND A SECOND PACKET FROM THE FIRST SERVER TO THE CLIENT DEVICE, THE SECOND PACKET INCLUDING AN INDICATION OF THE SECOND DESTINATION PORT
616

↓

ESTABLISH A SECOND MULTIPATH CONNECTION BETWEEN THE SECOND DESTINATION PORT OF THE SERVER AND THE SECOND SOURCE PORT OF THE CLIENT DEVICE
618

FIG. 6B

DISTRIBUTED RESILIENT LOAD-BALANCING FOR MULTIPATH TRANSPORT PROTOCOLS

RELATED APPLICATIONS

This application claims priority to and is a continuation of U.S. patent application Ser. No. 16/853,048, filed on Apr. 20, 2020, the entire contents of which are incorporated herein by reference.

TECHNICAL FIELD

The present disclosure relates generally to communications of data through distributed application load-balancing architectures using transport layer network protocols.

BACKGROUND

Along with the advent of cloud computing platforms and architectures has come the utilization of distributed applications running on these cloud platforms to provide application services at scale. At a high level, distributed applications are software applications that are replicated across networks of servers such that individual instances of the application can serve clients that desire use of the distributed application service. Often, distributed application services use application load-balancing architectures where load balancers are gathered in a layer and dispatch connections from clients to servers hosting the application. Using these cloud platforms, the number of application instances running can scale based on the change in traffic due to changes in client demand for use of the application service. Similarly, the load-balancing layer is generally scalable at will to meet variations in the traffic.

In order to scale the servers hosting the distributed applications, the load-balancers may assign connections to servers using consistent hashing for reliability. In this way, the servers and connections can scale without affecting the integrity of the overall application service. For example, when a client device sends a request for a connection to a server hosting an application (e.g., using a virtual IP address for the application service), the request hits one of the load balancers in the load balancer layer. The load balancer then assigns that connection to a server in a distributed hash table that is maintained by each load balancer.

Ideally, the load balancers need to perform minimal processing on the packets to route the packets, such as by simply extracting the network five-tuple from the packets sent from the client devices over the connections. Using the network five-tuple, the load balancers may use a hashing function to generate a hash of the network-five tuple, and those hashes are in turned assigned to buckets in a hashing table which point to application servers that are serving the connections. In this way, the network five-tuple of data packets sent using the connections are used to determine to which server the packet is to be routed. While this works well for unicast transport protocols where each device has a single flow open, these techniques may break down when client devices and/or application services desire to use multipath transport protocols. For instance, if a client device attempts to open a subflow using a multipath transport protocol, the load balancer that receives packets from in subflow may simply extract the network five-tuple from packets and assign the subflow to a different application server than the application server that is servicing the main subflow. Accordingly, distributed application load-balancing architectures are incompatible with multipath transport protocols.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIGS. 6A and 6B collectively illustrate a flow diagram of an example method for establishing multiple communication subflows between a client device and a distributed application architecture using a multipath transport protocol, such as QUIC.

DESCRIPTION OF EXAMPLE EMBODIMENTS

Overview

Figure 1:
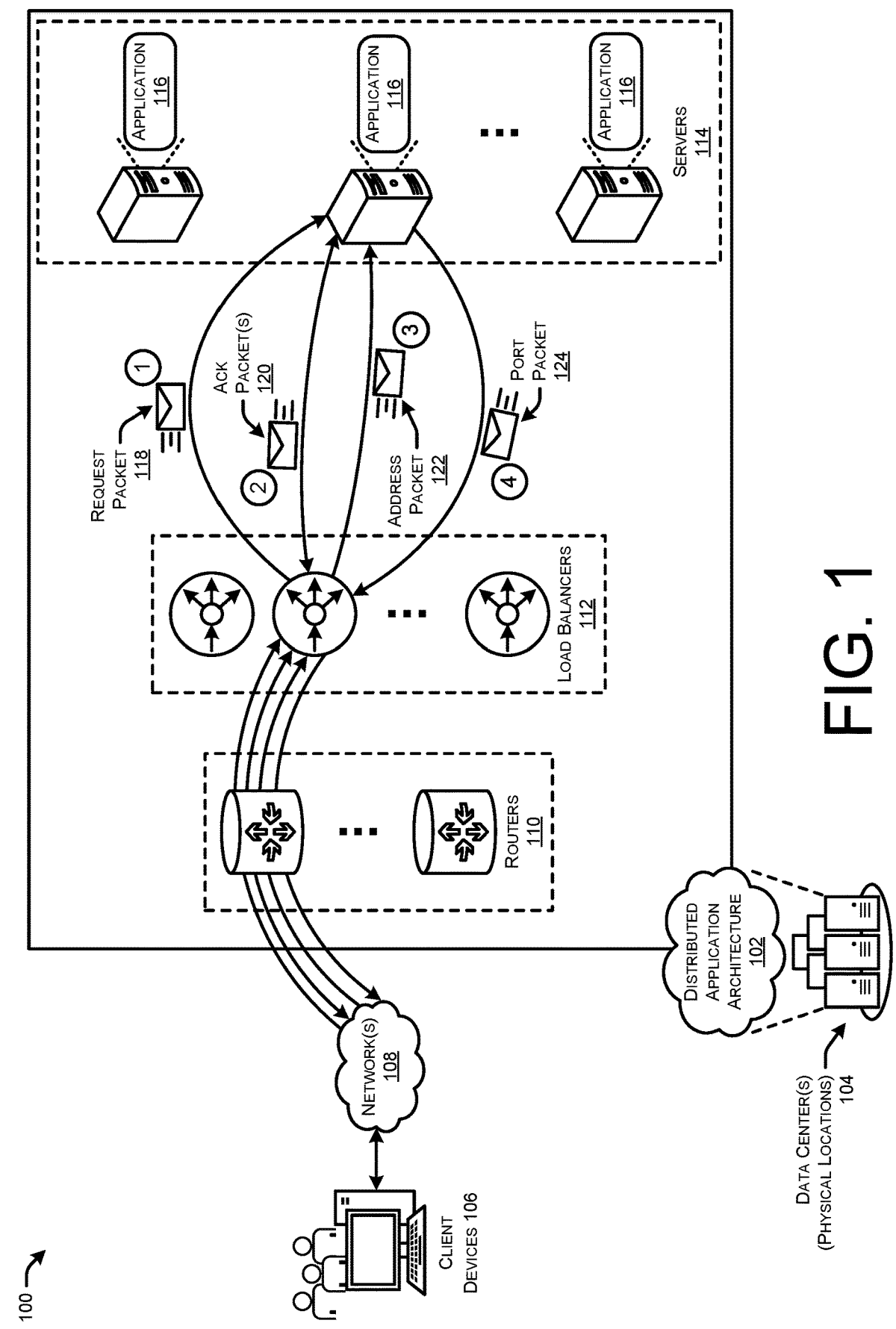
FIG. 1 illustrates a system-architecture diagram of an example distributed application architecture that supports a multipath transport protocol, such as MultiPath Transmission Control Protocol (MPTCP), for clients that attempt open multiple subflows with an application server.

This disclosure describes techniques for providing a distributed application load-balancing architecture that is capable of supporting multipath transport protocol. A method to perform techniques described herein includes receiving, at a server and via a load balancer of the distributed application architecture, a request packet indicating a request to establish a multipath connection between the server and a client device. The request packet may comprise first values indicating at least a first source port and a first source address of the client device, a first destination port of the server, and a destination address associated with the application service. Further, the method may include sending an acknowledgment packet to the client device where the acknowledgement packet includes a flag to prevent the client device from opening additional subflows on the first destination port. The method may further include completing opening of a first subflow on the multipath connection between the first destination port of the client device and the first destination port of the server. The method may further include receiving, over the first subflow of the multipath connection, an advertisement packet from the client device indicating a second source port and a second source address associated with the client device. Additionally, the method may include computing a second destination port of the server such that a first hash of the first values corresponds to a second hash of second values. In some examples, the second values indicate the second source port and the second source address of the client device, the second destination port of the server, and the destination address associated with the application service. Even further, the method may include sending, to the client device, an address-advertisement message indicating the second source port, and completing opening of a second subflow on the multipath connection between the second destination port of the client device and the second destination port of the server.

Additionally, the techniques described herein may be performed by a system and/or device having non-transitory computer-readable media storing computer-executable instructions that, when executed by one or more processors, performs the method described above.

Example Embodiments

Cloud computing architectures and platforms have provided means for application developers to provide distributed application services to many clients that scale on these cloud architectures. A distributed application service may be supported by networks of servers that are running replicated versions of the application to service requests from client devices at scale. Often, the servers in the distributed application service are positioned behind a load balancer layer where load balancers are gathered and dispatch connections from client devices to the application servers hosting the application.

In order to scale the servers hosting the distributed applications, the load-balancers may assign connections to servers using consistent hashing for reliability. In this way, the servers and connections can scale without affecting the integrity of the overall application service. For example, when a client device sends a request for a connection to a server hosting an application (e.g., using a virtual IP address for the application service), the request hits one of the load balancers in the load balancer layer. The load balancer then assigns that connection to a server in a distributed hash table that is maintained by each load balancer.

Ideally, the load balancers need to perform minimal processing on the packets to route the packets, such as by simply extracting the network five-tuple from the packets sent from the client devices over the connections. Using the network five-tuple, the load balancers may use a hashing function to generate a hash of the network-five tuple, and those hashes are in turned assigned to buckets in a hashing table which point to application servers that are serving the connections. In this way, the network five-tuple of data packets sent using the connections are used to determine to which server the packet is to be routed. While this works well for unicast transport protocols where each device has a single flow open, these techniques may break down when client devices and/or application services desire to use multipath transport protocols. For instance, if a client device attempts to open a subflow using a multipath transport protocol, the load balancer that receives packets from in subflow may simply extract the network five-tuple from packets and assign the subflow to a different application server than the application server that is servicing the main subflow. Accordingly, distributed application load-balancing architectures are incompatible with multipath transport protocols.

This disclosure describes techniques for providing a distributed application load-balancing architecture that is capable of supporting multipath transport protocol for client devices connecting to the supported application service. Rather than having client devices generate new network five-tuples for new subflows to the application servers, the techniques described herein include shifting the burden to the application servers to ensure that the new network five-tuples land in the same bucket in the consistent hashing table. The application servers may receive a hashing function utilized by the load balancers to generate the hash of the network five-tuple. Additionally, by placing the burden of generating the hashes on the application servers, the load balancers are able to continue the same stateless, low-level processing of the packets to route them to the correct application servers. In this way, additional subflows can be opened for client devices according to a multipath transport protocol while ensuring that the subflows are routed to the correct application server.

Although the techniques described herein are primarily with respect to MPTCP and QUIC, the techniques are generally scalable and usable for any multipath transport protocol. Further, although the techniques are described with reference to using hashes of network five-tuples for client devices in consistent hashing tables, the techniques are equally scalable for other types of data besides hashes of network five-tuples, and also for schemes outside of consistent hashing tables. For instance, any scheme used to assign subflows from client devices to appropriate application servers may benefit from the techniques of this application.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example distributed application architecture 102 that supports a multipath transport protocol, such as MultiPath Transmission Control Protocol (MPTCP), for clients that attempt open multiple subflows with an application server.

Generally, the distributed application architecture 102 may include devices houses or located ins one or more data centers 104 that may be located at different physical locations. For instance, the distributed application architecture 102 may be supported by networks of devices in a public cloud computing platform, a private/enterprise computing platform, and/or any combination thereof. The one or more data centers 104 may be physical facilities or buildings located across geographic areas that designated to store networked devices that are part of the distributed application architecture 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the distributed application architecture 102 may not be located in explicitly defined data centers 104, but may be located in other locations or buildings.

The distributed application architecture 102 may be accessible to client devices 106 over one or more networks 108, such as the Internet. The distributed application architecture 102, and the networks 108, may each respectively include one or more networks implemented by any viable communication technology, such as wired and/or wireless modalities and/or technologies. The distributed application architecture 102 and networks 108 may each may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof. The distributed application architecture 102 may include devices, virtual resources, or other nodes that relay packets from one network segment to another by nodes in the computer network.

In some examples, the distributed application architecture 102 may provide, host, or otherwise support one or more application services for client devices 106 to connect to and use. The client devices 106 may comprise any type of device configured to communicate using various communication protocols (e.g., MCTCP, QUIC, and/or any other protocol) over the networks 108. For instance, the client device 106 may comprise personal user device (e.g., desktop computers, laptop computers, phones, tablets, wearable devices, entertainment devices such as televisions, etc.), network devices (e.g., servers, routers, switches, access points, etc.), and/or any other type of computing device.

The application services may be distributed applications such that groups of servers 114 are configured to scale up or down to support instances of an application 116 to service client requests based on demand from the client devices 106. In some examples, the physical servers 114 may each have their own physical IP (PIP) address through which they are reachable, but a client device need only know the virtual IP (VIP) address for the application service as a whole in order to access an instance of an application 116 hosted on the servers 114. In this way, client devices 106 need only know a single VIP to access an application service, and the request to use the application service will be routed to one of the hosted applications 116 on one of the severs 114.

In some examples, the distributed application architecture 102 may include a first layer of routers 110, which may be less reliable routers that route messages based on, for example, equal-cost multi-path (ECMP) routing. For instance, the routers 110 may use ECMP, which is a strategy where next-hop packet forwarding to a single destination can occur over multiple "best paths" which tie for top place in routing metric calculations. Further, any routing strategy may be used by the routers 110, such as Open Shortest Path First (OSPF), Intermediate System to Intermediate System (ISIS), Enhanced Interior Gateway Routing Protocol (EIGRP), and/or Border Gateway Protocol (BGP) in conjunction with ECMP routing.

The routers 110 may balance traffic based on a hash of the network five-tuple, to a set of instances of load balancers 112 in the distributed application architecture 102. The layer of load balancers 112 may use a consistent hashing table to map network five-tuples to a "bucket" (with largely more buckets than servers 114). Each bucket in the consistent hashing table contains the address (e.g., PIP) of the current application server to which it points. And also contains then previous server addresses (e.g., n=1, n=2, etc.) that used to be pointed to by the particular bucket. Generally, the consistent hashing tables mean that the hashing table is identical and stored on each of the load balancers 112, and the mapping from the buckets to the application servers 114 hosting the application(s) 116 exhibits negligent amounts of changes when there is a reshuffling of the pool of servers 114.

Generally, upon a reshuffling in the layer of load balancers 112 (e.g., a load balancer instance 112 is added or removed, a network address is modified, etc.), the ECMP function executed by the routers 110 will rebalance traffic to different load balancers 112. Due to the use identical hashing tables among the instances of load balancers 112, a newly added load balancer 112 in the layer will contain the correct server address with high probability using the consistent hashing table. Thus, the routers 110 can being routing traffic to new load balancers 112 with ease. Further, upon a reshuffling in the pool of application servers 114 (e.g., an application server 114 is added or removed), due to the use of a stable hashing algorithm, the flow is still mapped by the load balancers 112 to the correct server address with high probability. In some instances, there is a small probability that the application server 114 selected by the load balancer 112 is not the correct one. To cope with this issue, when the load balancer 112 issues packets to a server 114, it encapsulates the packet using the address of that server 114, and also embeds the address(es) of the previous server(s) 114 as part of the encapsulating header (e.g., using IP options, using IPv6 Segment Routing (SRv6), etc.).

Generally, a client device 106 may obtain the publicly advertised VIP (e.g., advertised using Border Gateway Protocol (BGP) or similar protocols) of the application service hosted in the distributed application architecture 102, and send a request to the VIP to use the application service. To initiate a communication session with the distributed application service, the client device 106 may send a request to establish a connection to the VIP address that is advertised by the application service. In an example where the client device 106 is configured to use TCP, the client device 106 may initiate a TCP handshake by sending a TCP SYN message to the VIP over the networks 108 that is received at the distributed application architecture 102. Using example syntax for illustrative purposes, the TCP SYN message may be sent to a destination port called "dport" of a server with the address "VIP," and the SYN message may include the MP_CAPABLE option that indicates the client device 106 is capable of MPTCP. The SYN packet may be sent over the networks 108 (e.g., the Internet) to a device in the distributed application architecture 102. At "1", the request packet 118 (e.g., the SYN message) is forwarded by one of the routers 110 and a load balancer 112 to a given application server 114.

The application server 114 receives the request packet 118 (TCP SYN), and the server 114, at "2," replies with a TCP SYN-ACK packet, with the MP_CAPABLE option, and also including the "C" flag. The "C" flag prevents the client device 106 from opening additional subflows to be opened to this address and port. Thus, the "C" flag in the ACK packet 120 will make it so the client device 106 is be unable to open additional subflows to the "dport" port at the "VIP" address. After receiving the ACK packet 120, the client device 106 responds with a TCP ACK to complete the TCP handshake, and the connection continues.

After establishing the TCP connection, the client device 106 may advertise an address "c2" (and potentially a new port "sport2"—and if not, then "sport2" is deemed equal to "sport") for a second interface in an address packet 122, such as an ADD_ADDR MPTCP packet. The address packet 122 (ADD_ADDR MPTCP packet) may be sent over the main subflow of the TCP connection. However, because the client device 106 received the "C" flag in the SYN-ACK packet 120, the client device 106 solely advertises its address without attempting to open a subflow with the server 114.

The server 114 that receives the address packet 122 may have been provided with the hashing function utilized by the load balancers 112 to generate the hash of the network five-tuple. Using that hashing function, the server 114 that receives that address packet 122 can compute a port "dport2" such that the hash of the network five-tuple of packets in the initial subflow correspond to the hash of the network five-tuple of packets to be in the additional subflow that is generated based at least in part on the address packet 122. Following the above example, the server 114 may using the hashing function to compute a port "dport" such that "hash(c2, sport2, VIP, dport2, tcp)=hash(c, sport, VIP, dport, tcp)" where the hash is the hashing function used by the load balancers 112 to map the network five-tuples to consistent-hashing buckets. The server 114 may iteratively (e.g., brute force) the "dport2" until finding the same hash value (e.g., by retrying if the server is already listening on the port just computed).

At "4," the server 114 may then advertise the computed port "dport2" with a port packet 124, which may comprise an ADD_ADDR MPCTP packet, that is sent towards the client device 106. The port packet 124 may contain the two-tuple of "(vip, dport2)" to inform the client device 106 as to what destination port of the server 114 is to be used for a subflow to achieve the correct hash of the network five-tuple for packets to end up in the current consistent hashing bucket for the correct server 114.

The client device 106 can then open a new MPTCP subflow from "(c2, sport2)" to "(VIP, dport2)." Because this constitutes a different five-tuple than before, it may be that the ECMP strategy executed by the routers 110 forwards packets in the new subflow to a different load balancer 112 than before. However, as the "dport2" has been suitably picked by the server 114, the new load balancer 112 will find the same consistent-hashing bucket as before and forward the packet to the correct server 114. In examples where the set of application servers 114 has changed, the load balancer 112 uses the same mechanism where the load balancer 112 embeds the previous addresses of the server 114 that used to be mapped by this bucket, and let the incorrect servers 114 forward the packet until the correct server 114 is reached.

The above-noted example is merely illustrative, and various changes made be made to achieve similar or the same results. For instance, rather than using TCP ports such as "dport" and "dport2," in an Internet Protocol version 6 (IPv6) environment, the techniques can similarly be performed using destination IPv6 addresses (e.g., by using the last bytes of a /64 prefix).

Figure 2:
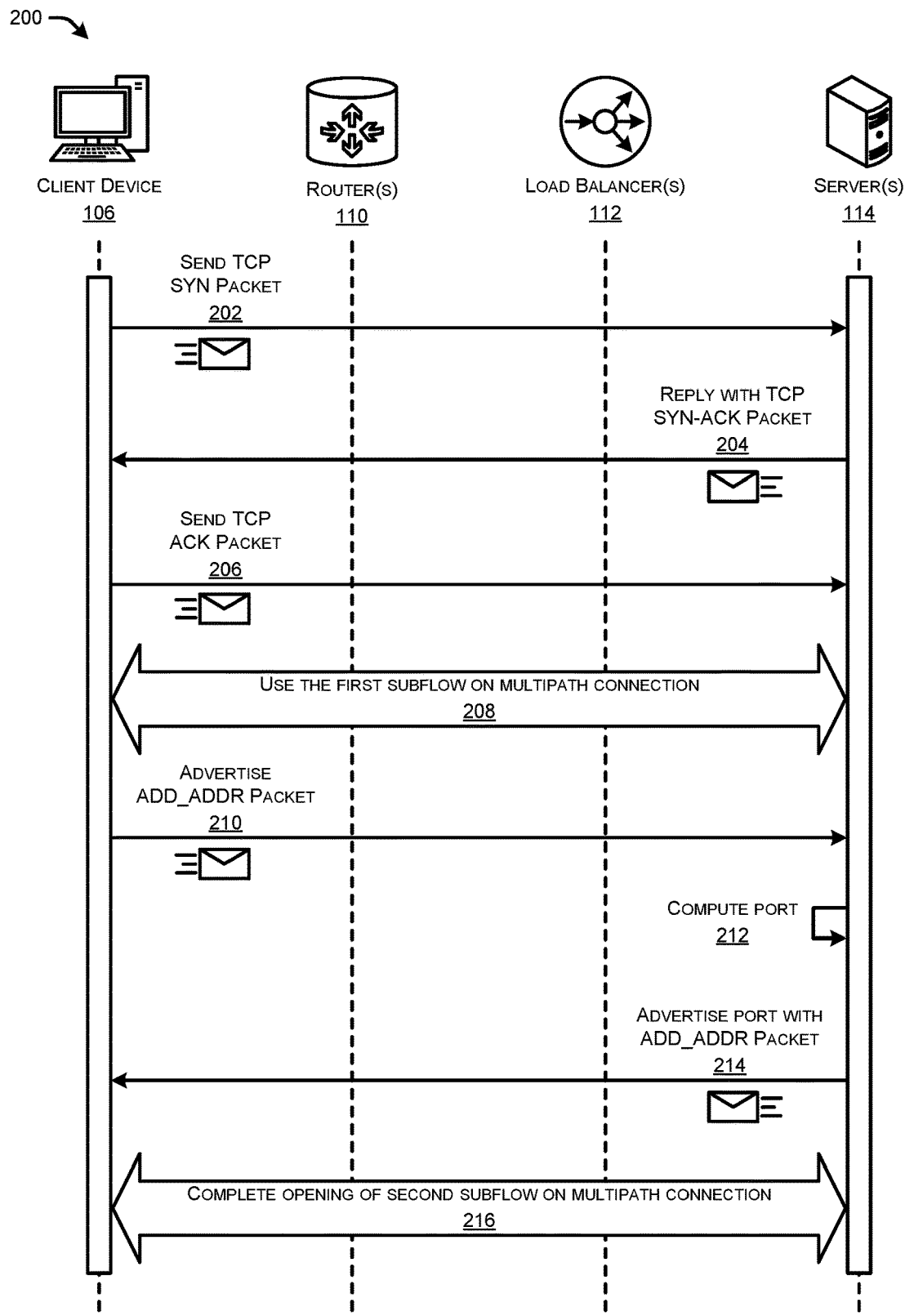
FIG. 2 illustrates a flow diagram of an example communication session between a client device and devices in a distributed application architecture where the client device opens multiple subflows according to a multipath transport protocol, such as MPTCP, via the devices in the distributed application architecture.

FIG. 2 illustrates a flow diagram 200 of an example communication session between a client device 106 and devices in a distributed application architecture 102 where the client device 106 opens multiple subflows according to a multipath transport protocol, such as MPTCP, via the devices in the distributed application architecture 102.

At 202, the client device may send a TCP SYN packet to a server 114 via one or more routers 110 and one or more load balancers 112. The TCP SYN packet may, for illustrative purposes, be sent to the destination port "dport" of the server 114 with a particular virtual IP address "VIP" for the application service supported by the server 114.

At 204, the server 114 replies with a TCP SYN-ACK packet, with the MP_CAPABLE option, and with the "C" flag which prevents additional subflows to be opened to the VIP address that the "dport." The SYN-ACK packet is then sent through the load balancers 112, routers 110, and to the client device 106.

At 206, the client device 106 may send a TCP ACK packet to the server 114 to complete the TCP handshake. At 208, after completing the TCP handshake, the client device 106 and the server 114 may use the first subflow on the multipath connection, such as by communicating data using the first subflow of the multipath connection.

After a period of time, at 210, the client device 106 may advertise an ADD_ADDR packet to the server 114 with which the first subflow on the multipath connection is opened. The ADD_ADDR MPTCP packet may simply be an advertisement of the new source address and/or new source port, but may not be an attempt to open a new subflow due to the "C" flag previously indicated.

At 212, the server 114 may compute a new destination port "dport2." For example, the server 114 may compute a port "dport2" such that the hash of the network five-tuple of packets in the initial subflow correspond to the hash of the network five-tuple of packets to be in the additional subflow that is generated based at least in part on the address packet 122. Following the above example, the server 114 may using the hashing function to compute a port "dport" such that "hash(c2, sport2, VIP, dport2, tcp)=hash(c, sport, VIP, dport, tcp)" where the hash is the hashing function used by the load balancers 112 to map the network five-tuples to consistent-hashing buckets. The server 114 may iteratively (e.g., brute force) the "dport2" until finding the same hash value (e.g., by retrying if the server is already listening on the port just computed).

At 214, the server 114 may advertise the computed port "dport2" with a port packet 124, which may comprise an ADD_ADDR MPCTP packet, that is sent towards the client device 106. The port packet 124 may contain the two-tuple of "(vip, dport2)" to inform the client device 106 as to what destination port of the server 114 is to be used for a subflow to achieve the correct hash of the network five-tuple for packets to end up in the current consistent hashing bucket for the correct server 114. At 216, the client device 106 can then complete opening of a second MPTCP subflow on the multipath connection with the server 114, such as by completing another TCP handshake.

Figure 3:
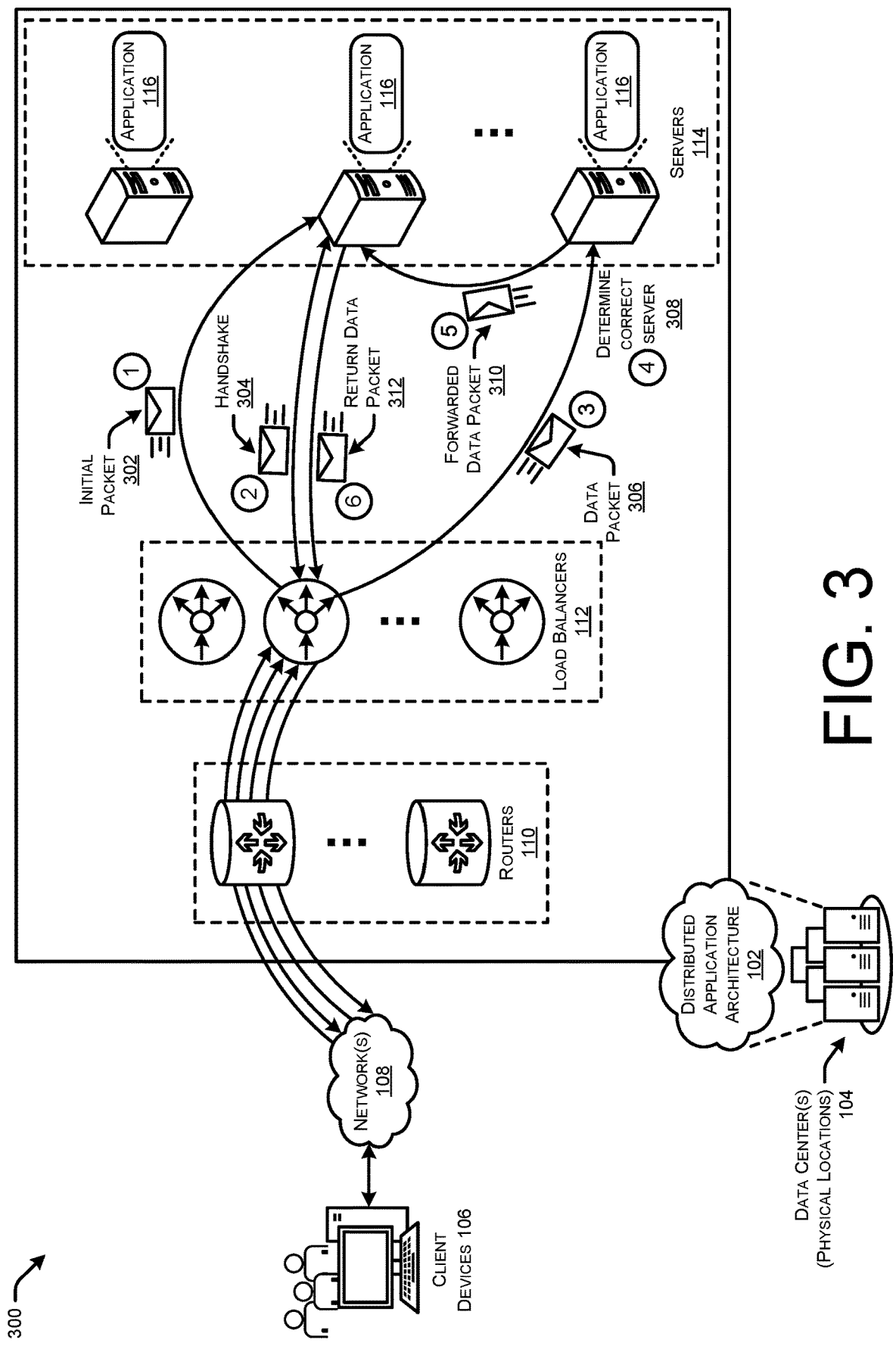
FIG. 3 illustrates a system-architecture diagram of an example distributed application architecture that supports a multipath transport protocol, such as Quick User Datagram Protocol Internet Connections (QUIC), for clients that attempt open multiple subflows with an application server.

FIG. 3 illustrates a system-architecture diagram 300 of an example distributed application architecture 102 that supports a multipath transport protocol, such as QUIC, for client devices 106 that attempt open multiple subflows with an application server 114. As opposed to MPTCP, there is no "C" flag option to prevent the client device 106 from using a new source address. Rather, using QUIC a client device 106 wishing to use a new source address can just send packets from that address, and the server 114 should use that address for subsequent packets. Further, QUIC uses connections IDs in the UDP payload to identify connections. The connection IDs that each endpoint includes in the packets it sends are specified by the other endpoint. Each endpoint can offer several connection IDs to its peer for the same connection. When using a new source address, QUIC endpoints must use a new connection ID. Further, QUIC specifies that it should be impossible for an attacker seeing the packets to know whether two packets with different connection IDs and a different five-tuple belong to the same connection.

Thus, QUIC makes it possible to implement load balancers that do not rely on L3/L4 info but solely on the QUIC payload. Assuming that there is a way to map connection IDs to a server 114, such load balancers 112 can achieve perfect consistency even in the face of changes in the set of backend servers 114. However, the connections IDs are of variable length and are often encrypted in order to satisfy QUIC's requirement that it should be impossible for an external observer to map connections IDs to connections. This makes such a load balancer 112 unsuitable for a hardware implementation.

The techniques described herein include relying on UDP load balancers 112 and that achieves perfect consistency. To do so, the techniques provide the servers 114 with a way to map connection IDs to a backend server 114. Generally, QUIC connection IDs have a variable length between 0 and 144 bits, and the mapping can be easily achieved by embedding a server identifier in the ID, or even (part of) the server's IP address directly.

As shown, a client device 106 may send an initial packet at 302 at "1" using a source endpoint "(saddr1, sport1)" to the port "(dport, VIP)" of a server 114. The initial packet 302 may be forwarded by the router 110 layer and the load balancer 112 layer to the server 114. The server 114 chooses a set of connection IDs that belong to it for this connection. At "2," the QUIC handshake takes place by replying with the handshake 304, and the connection is established and goes on between the client device 106 and the server 114.

After a period of time, the client device 106 may determine at "3" to use a new source endpoint "(saddr2, sport2)" to send a new data packet 306. For instance, the client device 106 may have moved between different access endpoints (e.g., moved between WiFi routers, moved from WiFi to cellular networks, etc.). The load balancer 112 may have no way to match the new data packet 306 to the previous QUIC connection, and may forward the data packet 306 to another server 114. The receiving server 114 may decode the packet, check the connection IDs, and determine that the connection ID(s) belong to another server. At "4," the server 114 may determine the server that was originally in the QUIC connection based on the mapping from connection IDs to servers 114. The incorrect server 114 may then encapsulate and, at "5," forward the forwarded data packet 310 to the correct, original server 114.

Upon receiving the forwarded data packet 310 with the new source endpoint, the original server 114 may compute a new port "dport2" such that a "hash(saddr2, sport2, vip, dport2, udp)=hash(saddr1, sport1, vip, dport, udp)" where the hash is the hashing function used by the load balancers 112 to map network five-tuples to consistent hashing buckets (similar to MPTCP, it is possible to change the destination address in addition to, or in place of, the destination port). The original server 114 may then start sending return data packets 312 at "6" using dport2 as the source port. Upon the client device 106 receiving the first return data packet 312 that uses the dport2 as the source port, the client device 106 will then start using dport2 as the destination port for new packets. In this way, the packets sent from the client device 106 will be routed directly to the original, correct server 114 that has been servicing the flows.

Figure 4:
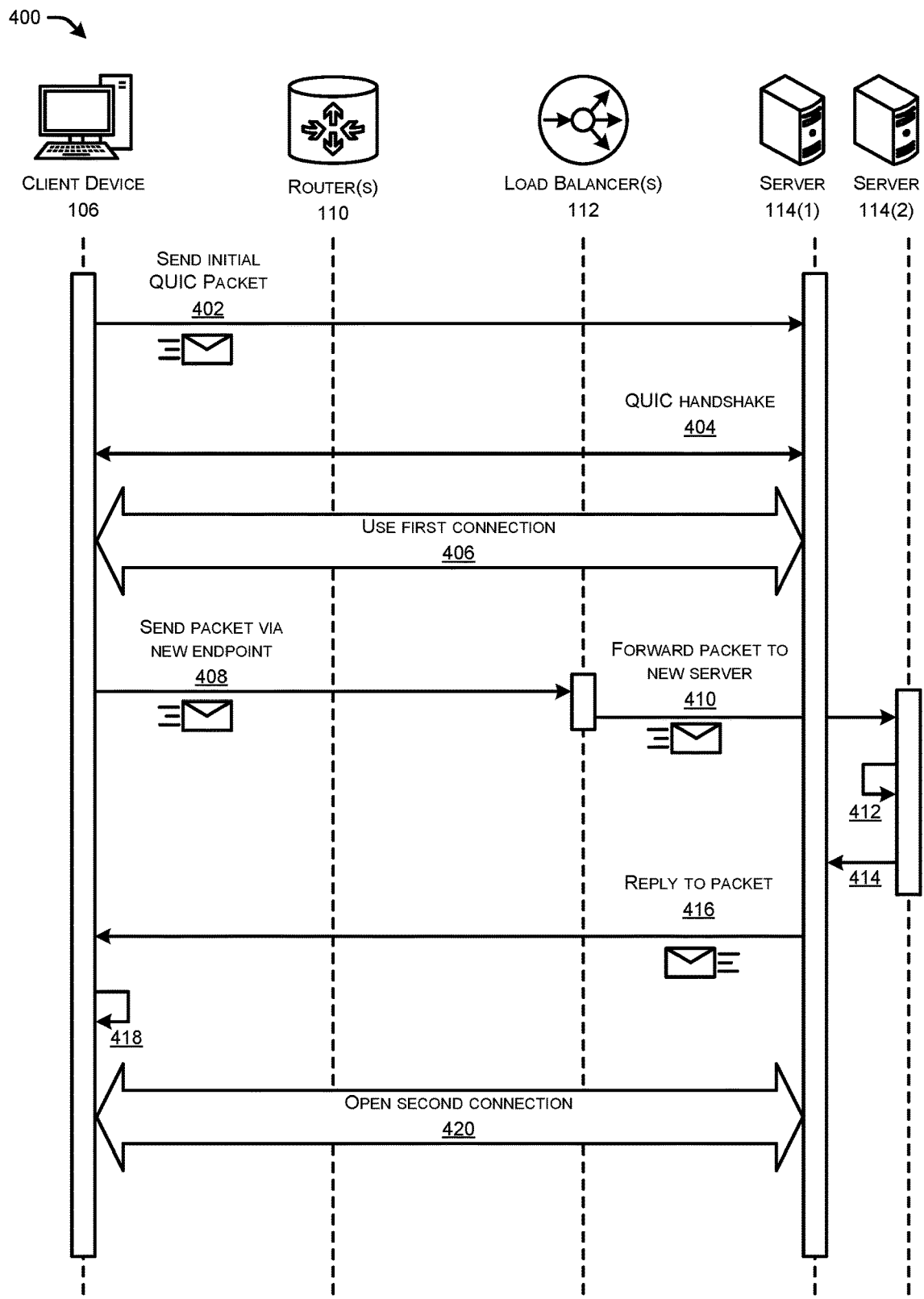
FIG. 4 illustrates a flow diagram of an example communication session between a client device and devices in a distributed application architecture where the client device opens multiple subflows according to a multipath transport protocol, such as QUIC, via the devices in the distributed application architecture.
Figure 5A:
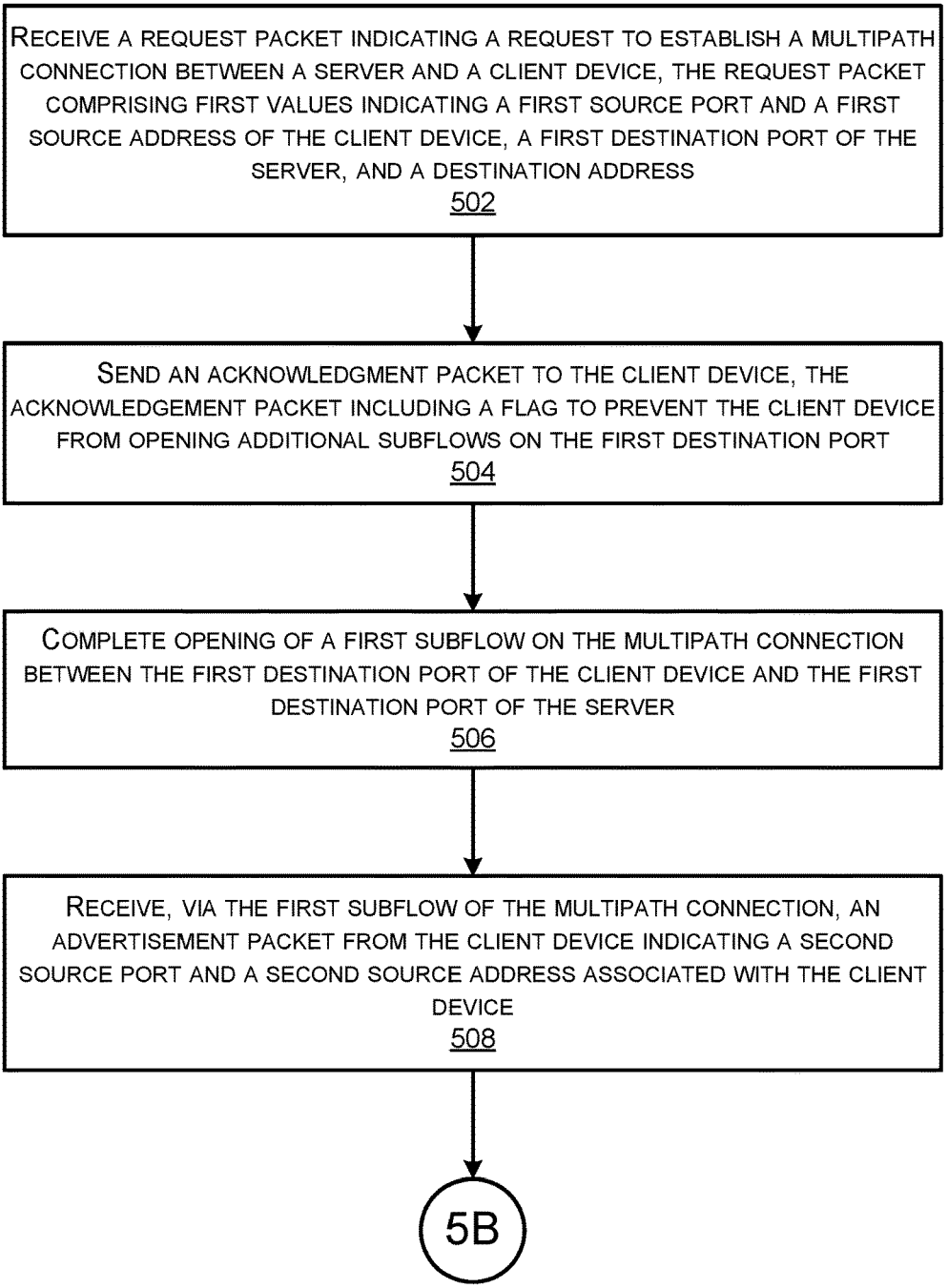
FIGS. 5A and 5B collectively illustrate a flow diagram of an example method for establishing multiple communication subflows between a client device and a distributed application architecture using a multipath transport protocol, such as MPCTP.
Figure 5B:
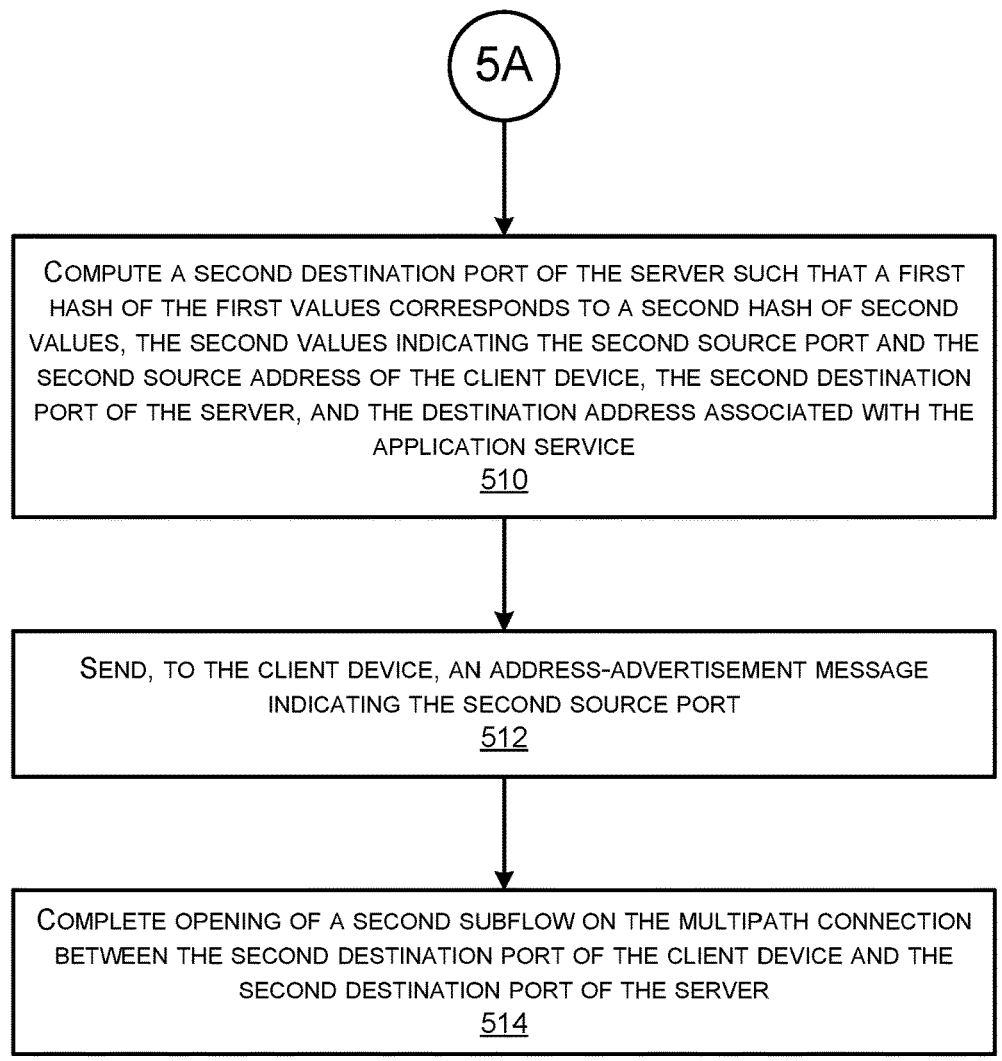

FIG. 4 illustrates a flow diagram 400 of an example communication session between a client device 106 and devices in a distributed application architecture 102 where the client device 106 opens multiple subflows according to a multipath transport protocol, such as QUIC, via the devices in the distributed application architecture 102.

At 402, a client may send an initial QUIC packet using a source endpoint "(saddr1, sport1)" to the port "dport" of a server 114(1) with address "vip." At 404, the server 114(1) may choose a set of connection IDs that belong to it for this connection, and completes the QUIC handshake with the client device 106. takes place by replying with the handshake 304. At 406, the connection has been opened between the client device 106 and the server 114(1) and the client device 106 and server 114(1) may begin using the first connection to communicate data back and forth.

After a period of time, the client device 106 may send, at 408, a packet via a new source endpoint "(saddr2, sport2)" that hits a load balancer 112. For instance, the client device 106 may have moved between different access endpoints (e.g., moved between WiFi routers, moved from WiFi to cellular networks, etc.). The load balancer 112 may have no way to match the new data packet 306 to the previous QUIC connection, and at 410, the load balancer 112 may forward the packet to a second server 114(2). At 412, the second server 114(2) may decode the packet, check the connection IDs, and determine that the connection ID(s) belong to another server. The second server 114(2) may determine the server 114(1) that was originally in the QUIC connection based on the mapping from connection IDs to servers 114. At 414, the second server 114(2) may then encapsulate the packet and forward the data packet to the first server 114(1).

Upon receiving the forwarded data packet with the new source endpoint, the first server 114(1) may compute a new port "dport2" such that a "hash(saddr2, sport2, vip, dport2, udp)=hash(saddr1, sport1, vip, dport, udp)" where the hash is the hashing function used by the load balancers 112 to map network five-tuples to consistent hashing buckets (similar to MPTCP, it is possible to change the destination address in addition to, or in place of, the destination port).

At 416, the first server 114(1) may then start sending return data packets to the client device 106 using dport2 as the source port. At 418, the client device 106 may be receiving the return data packets that use the dport2 as the source port, and the client device 106 will then start using dport2 as the destination port for new packets. In this way, the packets sent from the client device 106 will be routed directly to the original, correct server 114 that has been servicing the flows. Thus, at 420, the client device 106 and the server 114(1) will continue the session to open a second connection.

FIGS. 5A, 5B, 6A, and 6B illustrate flow diagrams of example methods 500 and 600 that illustrate aspects of the functions performed at least partly by the devices in the distributed application architecture as described in FIGS. 1-4. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5A, 5B, 6A and 6B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more FIGS. 5A and 5B collectively illustrate a flow diagram of an example method 500 for establishing multiple communication subflows between a client device and a distributed application architecture using a multipath transport protocol, such as MPCTP. In some examples, the steps of method 500 may be performed, at least partly, by a server 114 in a distributed application architecture 102. The server 114 may be hosting a replicated application of an application service where the server comprises one or more processors and one or more non-transitory computer-readable media storing computer-executable instructions that, when executed by the one or more processors, cause the one or more processors to perform the operations of method 500.

At 502, the server 114 may receive, via a load balancer 112 of the distributed application architecture 102, a request packet 118 indicating a request to establish a multipath connection between the server 114 and a client device 106. In some examples, the request packet 118 comprises first values indicating at least a first source port and a first source address of the client device 106, a first destination port of the server 114, and a destination address associated with the application service.

At 504, the server may send an acknowledgment packet 120 to the client device 106. In some instance, the acknowledgement packet 120 includes a flag to prevent the client device 106 from opening additional subflows on the first destination port.

At 506, the server 114 may complete opening of a first subflow on the multipath connection between the first destination port of the client device 106 and the first destination port of the server. For instance, the server 114 and the client device 106 may complete a handshake to complete opening of the first subflow on the multipath connection. At 508, the server 114 may receive, via the first subflow of the multipath connection, an advertisement packet 122 from the client device 106 indicating a second source port and a second source address associated with the client device 106. Further, at 510, the server 114 may compute a second destination port of the server 114 such that a first hash of the first values corresponds to a second hash of second values. In such an example, the second values indicating the second source port and the second source address of the client device 106, the second destination port of the server 114, and the destination address associated with the application service.

At 512, the server 114 sends, to the client device 106, an address-advertisement message indicating the second source port. At 514, the serve 114 may open a second subflow on the multipath connection between the second destination port of the client device 106 and the second destination port of the server 114.

In some examples, the operations of method 500 may further comprise receiving a hashing function from the load balancer 112, wherein the hashing function is utilized by the load balancer to map network five-tuples to consistent-hashing buckets.

Figure 6A:
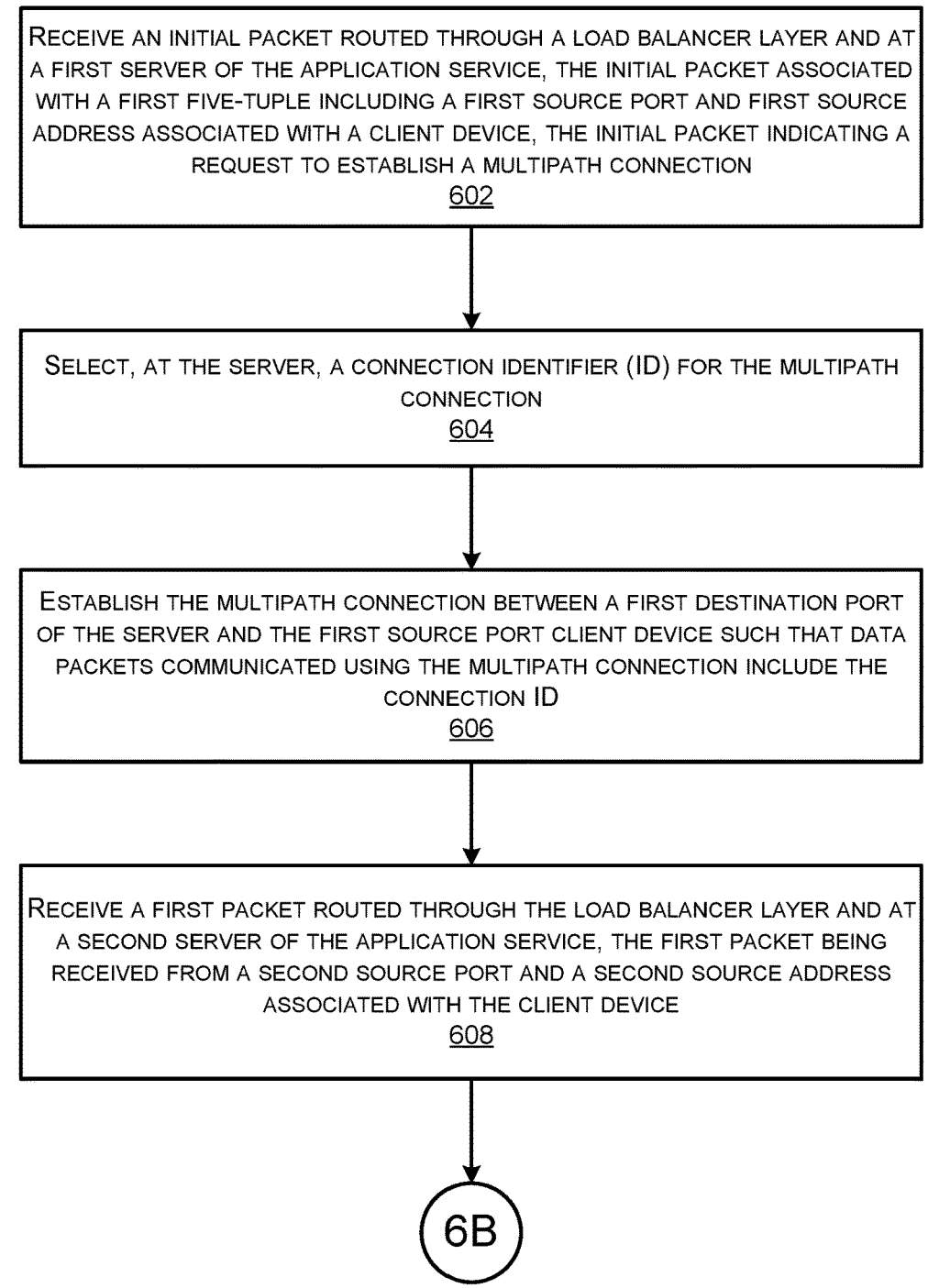

FIGS. 6A and 6B collectively illustrate a flow diagram of an example method 600 for establishing multiple communication subflows between a client device 106 and a distributed application architecture 102 using a multipath transport protocol, such as QUIC. In some examples, the steps of method may be performed at least in part by a distributed application system hosting an application service, the distributed application system comprising. The distributed application system may comprise one or more processors, and one or more non-transitory computer-readable media storing computer-executable instructions that, when executed by the one or more processors, cause the one or more processors to perform the operations of method 602.

At 602, the distributed application architecture 102 may receive an initial packet 302 routed through a load balancer layer 112 and at a first server 114. In some examples, the initial packet 302 may be associated with a first five-tuple including a first source port and first source address associated with a client device 106, the initial packet indicating a request to establish a multipath connection between the server 114 and the client device 106.

At 604, the server 114(1) may select a connection identifier (ID) for the multipath connection. At 606, the distributed application architecture 102 may establish the multipath connection between a first destination port of the server 114 and the first source port of the client device 106 such that data packets communicated using the multipath connection include the connection ID.

At 608, a second server 114(2) may receive a first packet routed through the load balancer layer of the application service where the first packet was received from a second source port and a second source address associated with the client device 106.

At 610, the second server 114(2) may identify the connection ID associated with the multipath connection at the first server 114(1). At 612, the second server 114(20 may, based at least in part on identifying the connection ID, forwarding the first packet to the first server 114(1). At 614, the first server 114(1) may at least partly responsive to receiving the first packet, compute a second destination port of the server 114(1) to be included in a second five-tuple such that a first hash of a first five-tuple corresponds to a second hash of the second five-tuple. At 616, the first server 114(1) may send a second packet to the client device 106 where the second packet including an indication of the second destination port. At 618, the first server 114(1) and the client device 106 may establish a second multipath connection between the second destination port of the server 114(1) and the second source port of the client device 106.

Figure 7:
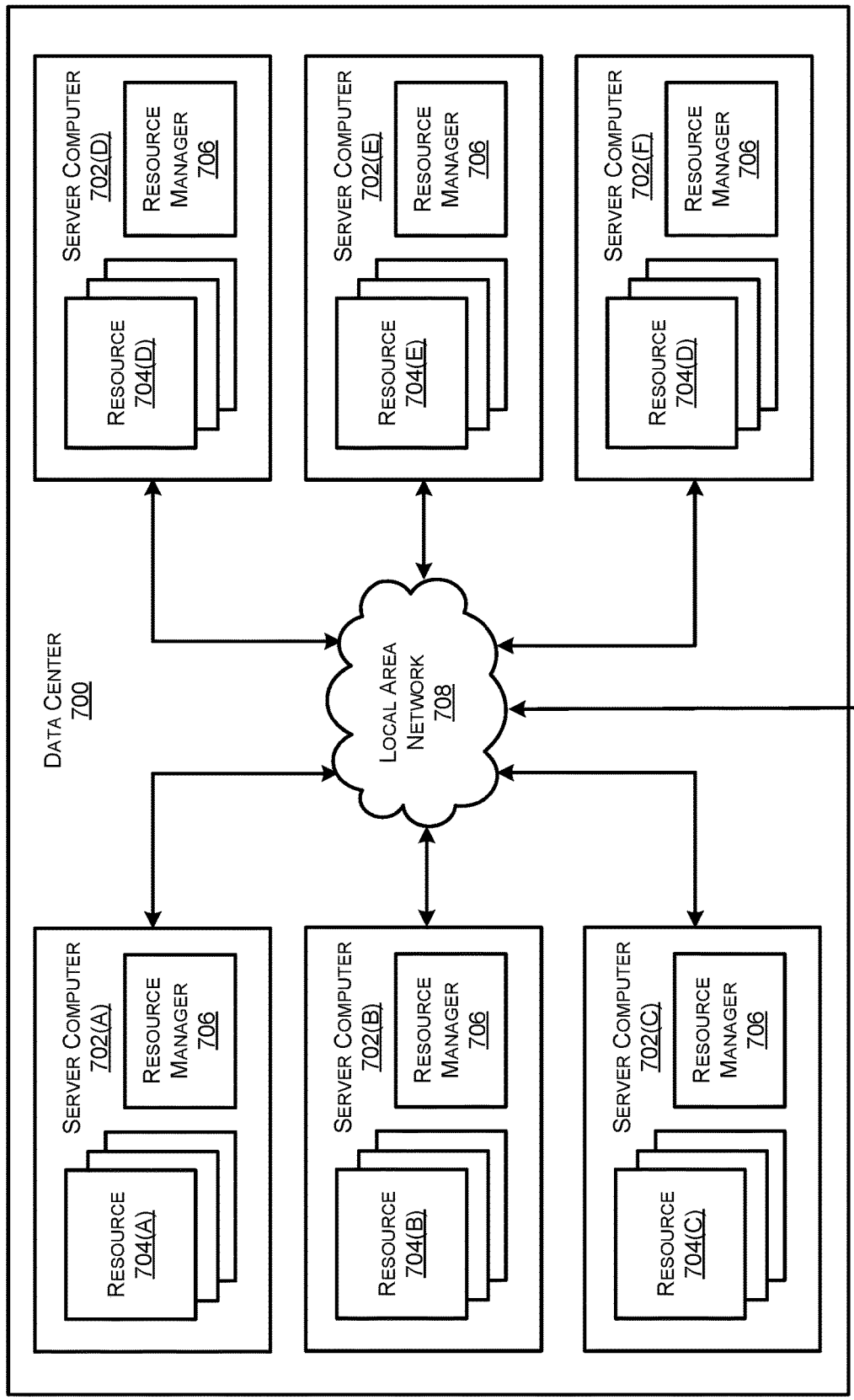
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rackmount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
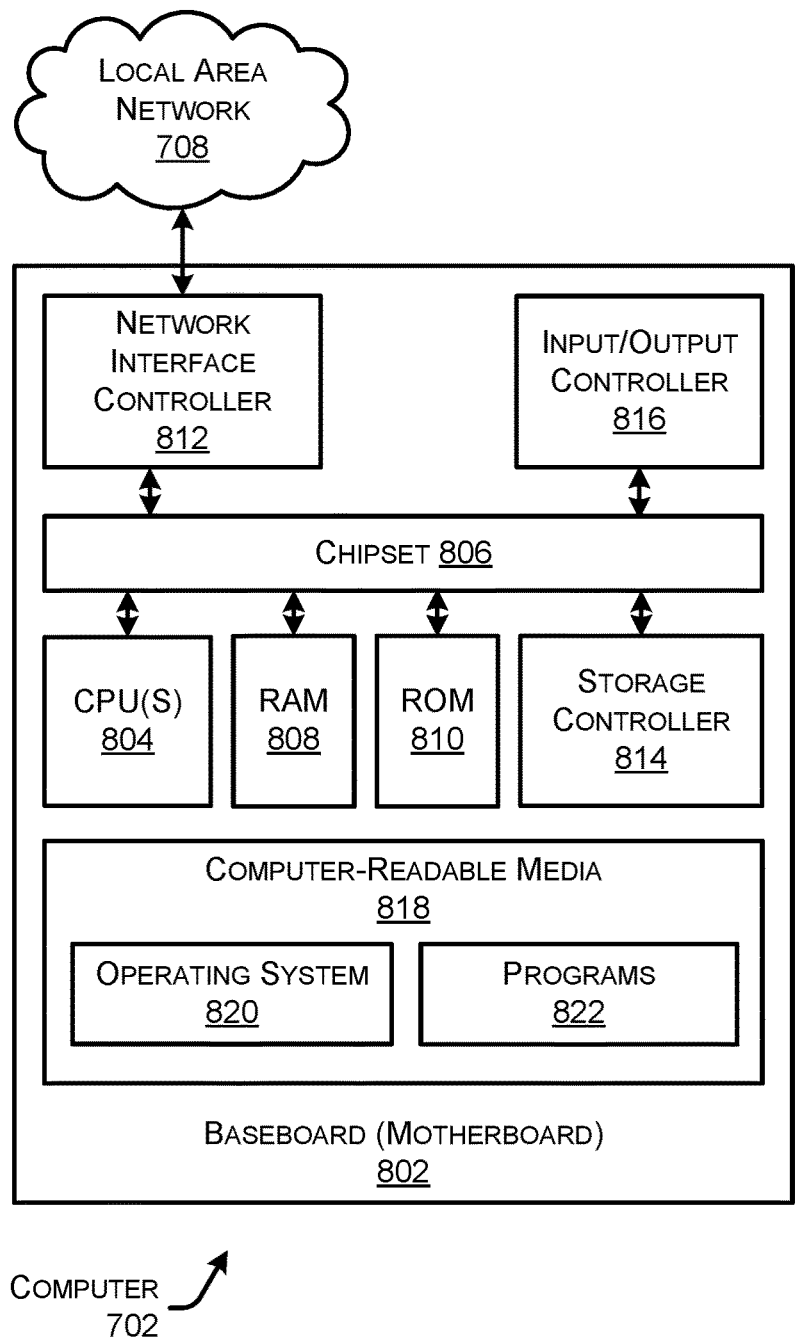
FIG. 8 is a computer architecture diagram showing an illustrative computer hardware architecture for implementing a computing device that can be utilized to implement aspects of the various technologies presented herein.

FIG. 8 shows an example computer architecture for a server computer 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The server computer 702 may, in some examples, correspond to a physical server 106 described herein, and may comprise networked devices such as servers, switches, routers, hubs, bridges, gateways, modems, repeaters, access points, etc.

The computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adderssubtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 702 to other computing devices over the network 708 (and/or 102). It should be appreciated that multiple NICs 812 can be present in the computer 702, connecting the computer to other types of networks and remote computer systems.

The computer 702 can be connected to a storage device 818 that provides non-volatile storage for the computer. The storage device 818 can store an operating system 820, programs 822, and data, which have been described in greater detail herein. The storage device 818 can be connected to the computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 818 by detecting the physical states or characteristics of one or more particular locations within the physical storage units.

In addition to the mass storage device 818 described above, the computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702. In some examples, the operations performed by devices in the distributed application architecture 102, and or any components included therein, may be supported by one or more devices similar to computer 702. Stated otherwise, some or all of the operations performed by the distributed application architecture 102, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more of a router 110, load balancer 112 and/or server 114. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by the router 110, load balancer 112 and/or server 114. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for providing a distributed application load-balancing architecture 102 that is capable of supporting multipath transport protocol. That is, the computer 702 may comprise any one of the routers 110, load balancers 112, and/or servers 114. The programs 822 may comprise any type of program that cause the computer 702 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more non-transitory computer-readable media storing computer-executable instructions that, when executed by the one or more processors, cause the one or more processors to perform operations comprising:
   receiving, at a first server, an initial packet routed through a load balancer layer, the initial packet associated with a first five-tuple including a first source port and first source address associated with a client device, the initial packet indicating a request to establish a first multipath connection between the first server and the client device;
   generating, at the first server and using a Quick User Datagram Protocol Internet Connections (QUIC), a QUIC connection identifier (ID) for the first multipath connection, the QUIC connection ID including an identifier of the first server;
   establishing the first multipath connection between a first destination port of the first server and the first source port of the client device such that data packets communicated using the first multipath connection include the QUIC connection ID;
   receiving a first packet routed through the load balancer layer and at a second server, the first packet being received from a second source port and a second source address associated with the client device;
   identifying, at the second server, the identifier of the first server from the QUIC connection ID associated with the first multipath connection at the first server;
   based at least in part on identifying the QUIC connection ID, forwarding the first packet to the first server;
   obtaining, at the first server, a hashing algorithm used by the load balancer layer to compute hashes for load balancing connections;
   at least partly responsive to receiving the first packet at the first server, computing, using the hashing algorithm, a second destination port of the first server to be included in a second five-tuple such that a first hash of a first five-tuple corresponds to a second hash of the second five-tuple;
   sending a second packet from the first server to the client device, the second packet including an indication of the second destination port; and
   establishing a second multipath connection between the second destination port of the first server and the second source port of the client device such that the load balancer layer forwards packets of the second multipath connection to the first server.

2. The system of claim 1, wherein the multipath connection comprises a QUIC connection.

3. The system of claim 1, the operations further comprising:
   receiving, at the load balancer layer, the first packet; and
   forwarding, by the load balancer layer, the first packet to the second server.

4. The system of claim 1, further comprising a routing layer configured to route packets to the load balancer layer using and equal-cost multi-path (ECMP) routing strategy.

5. The system of claim 1, wherein:
   the first server executes a first replica of a software application of an application service; and
   the second server executes a second replica of the software application of the application service.

6. The system of claim 1, wherein the initial packet comprises a QUIC initial packet.

7. A method comprising:
   receiving, at a first endpoint of a network, an initial packet routed through a load balancer layer, the initial packet associated with a first five-tuple including a first source port and first source address associated with a client device, the initial packet indicating a request to establish a first multipath connection between the first endpoint and the client device;
   generating, at the first endpoint and using a Quick User Datagram Protocol Internet Connections (QUIC), a QUIC connection identifier (ID) for the first multipath connection, the QUIC connection ID including an identifier of the first endpoint;
   establishing the first multipath connection between a first destination port of the first endpoint and the first source port of the client device such that data packets communicated using the first multipath connection include the QUIC connection ID;
   receiving a first packet routed through the load balancer layer and at a second endpoint of the network, the first packet being received from a second source port and a second source address associated with the client device;
   identifying, at the second endpoint, the identifier of the first server from the QUIC connection ID associated with the first multipath connection at the first endpoint;
   based at least in part on identifying the QUIC connection ID, forwarding the first packet to the first endpoint;
   obtaining, at the first endpoint, a hashing algorithm used by the load balancer layer to compute hashes for load balancing connections;
   at least partly responsive to receiving the first packet at the first endpoint, computing, using the hashing algorithm, a second destination port of the first endpoint to be included in a second five-tuple such that a first hash of a first five-tuple corresponds to a second hash of the second five-tuple;
   sending a second packet from the first endpoint to the client device, the second packet including an indication of the second destination port; and
   establishing a second multipath connection between the second destination port of the first endpoint and the second source port of the client device such that the load balancer layer forwards packets of the second multipath connection to the first endpoint.

8. The method of claim 7, wherein the multipath connection comprises a QUIC connection.

9. The method of claim 7, further comprising:
receiving, at the load balancer layer, the first packet; and
forwarding, by the load balancer layer, the first packet to the second endpoint.

10. The method of claim 7, the network further comprising a routing layer configured to route packets to the load balancer layer using and equal-cost multi-path (ECMP) routing strategy.

11. The method of claim 7, wherein:
the first endpoint executes a first replica of a software application of an application service; and
the second endpoint executes a second replica of the software application of the application service.

12. The method of claim 7, wherein the initial packet comprises a QUIC initial packet.

13. The method of claim 7, further comprising:
receiving, at the second endpoint, the hashing function, wherein the hashing function is utilized by the load balancer layer to map network five-tuples to consistent-hashing buckets,
wherein the computing the second destination port of the endpoint comprises:
using the hashing function on the first five-tuple resulting in the first hash; and
determining the second destination port included in the second values such that using the hashing function on the second five-tuple results in the second hash that corresponds to the first hash.

14. One or more non-transitory computer-readable media storing computer-executable instructions that, when executed by one or more processors, cause the one or more processors to perform operations comprising:
receiving, at a first server, an initial packet routed through a load balancer layer, the initial packet associated with a first five-tuple including a first source port and first source address associated with a client device, the initial packet indicating a request to establish a first multipath connection between the first server and the client device;
generating, at the first server and using a Quick User Datagram Protocol Internet Connections (QUIC), a QUIC connection identifier (ID) for the first multipath connection, the QUIC connection ID including an identifier of the first server;
establishing the first multipath connection between a first destination port of the first server and the first source port of the client device such that data packets communicated using the first multipath connection include the QUIC connection ID;
receiving a first packet routed through the load balancer layer and at a second server of the network, the first packet being received from a second source port and a second source address associated with the client device;
identifying, at the second server, the identifier of the first server from the QUIC connection ID associated with the first multipath connection at the first server;
based at least in part on identifying the QUIC connection ID, forwarding the first packet to the first server;
obtaining, at the first server, a hashing algorithm used by the load balancer layer to compute hashes for load balancing connections;
at least partly responsive to receiving the first packet at the first server, computing, using the hashing algorithm, a second destination port of the first server to be included in a second five-tuple such that a first hash of a first five-tuple corresponds to a second hash of the second five-tuple;
sending a second packet from the first server to the client device, the second packet including an indication of the second destination port; and
establishing a second multipath connection between the second destination port of the first server and the second source port of the client device such that the load balancer layer forwards packets of the second multipath connection to the first server.

15. The one or more non-transitory computer-readable media of claim 14, wherein the multipath connection comprises a QUIC connection.

16. The one or more non-transitory computer-readable media of claim 14, the operations further comprising:
receiving, at the load balancer layer, the first packet; and
forwarding, by the load balancer layer, the first packet to the second server.

17. The one or more non-transitory computer-readable media of claim 14, the network further comprising a routing layer configured to route packets to the load balancer layer using and equal-cost multi-path (ECMP) routing strategy.

18. The one or more non-transitory computer-readable media of claim 14, wherein:
the first server executes a first replica of a software application of an application service; and
the second server executes a second replica of the software application of the application service.

19. The one or more non-transitory computer-readable media of claim 14, wherein the initial packet comprises a QUIC initial packet.

20. The one or more non-transitory computer-readable media of claim 14, the operations further comprising:
receiving, at the second server, the hashing function, wherein the hashing function is utilized by the load balancer layer to map network five-tuples to consistent-hashing buckets,
wherein the computing the second destination port of the first server comprises:
using the hashing function on the first five-tuple resulting in the first hash; and
determining the second destination port included in the second values such that using the hashing function on the second five-tuple results in the second hash that corresponds to the first hash.

* * * * *